Feb. 20, 1923. 1,445,875
R. W. ELLINGHAM ET AL
GRINDING MACHINE
Filed Aug. 29, 1921 6 sheets-sheet 5

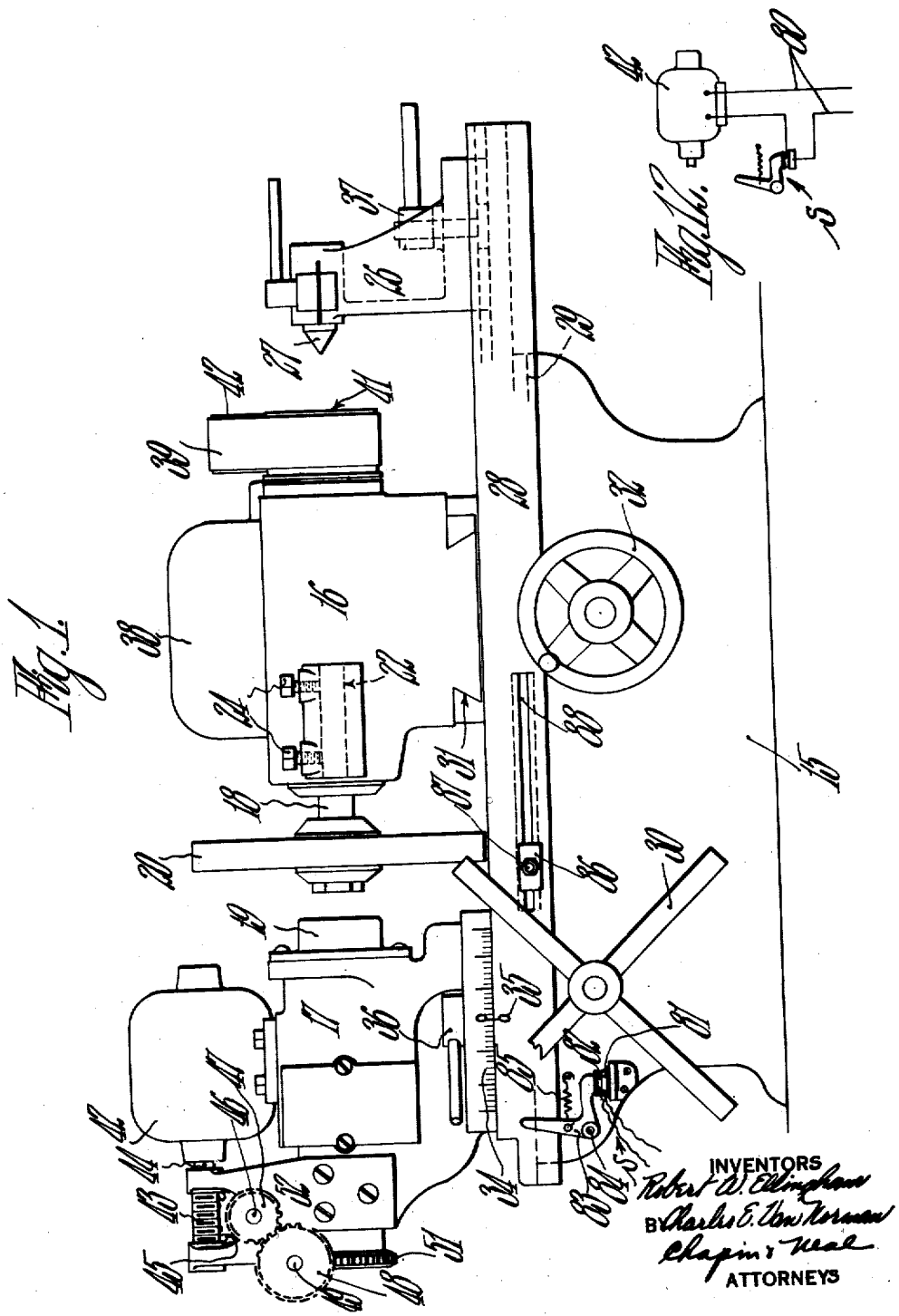

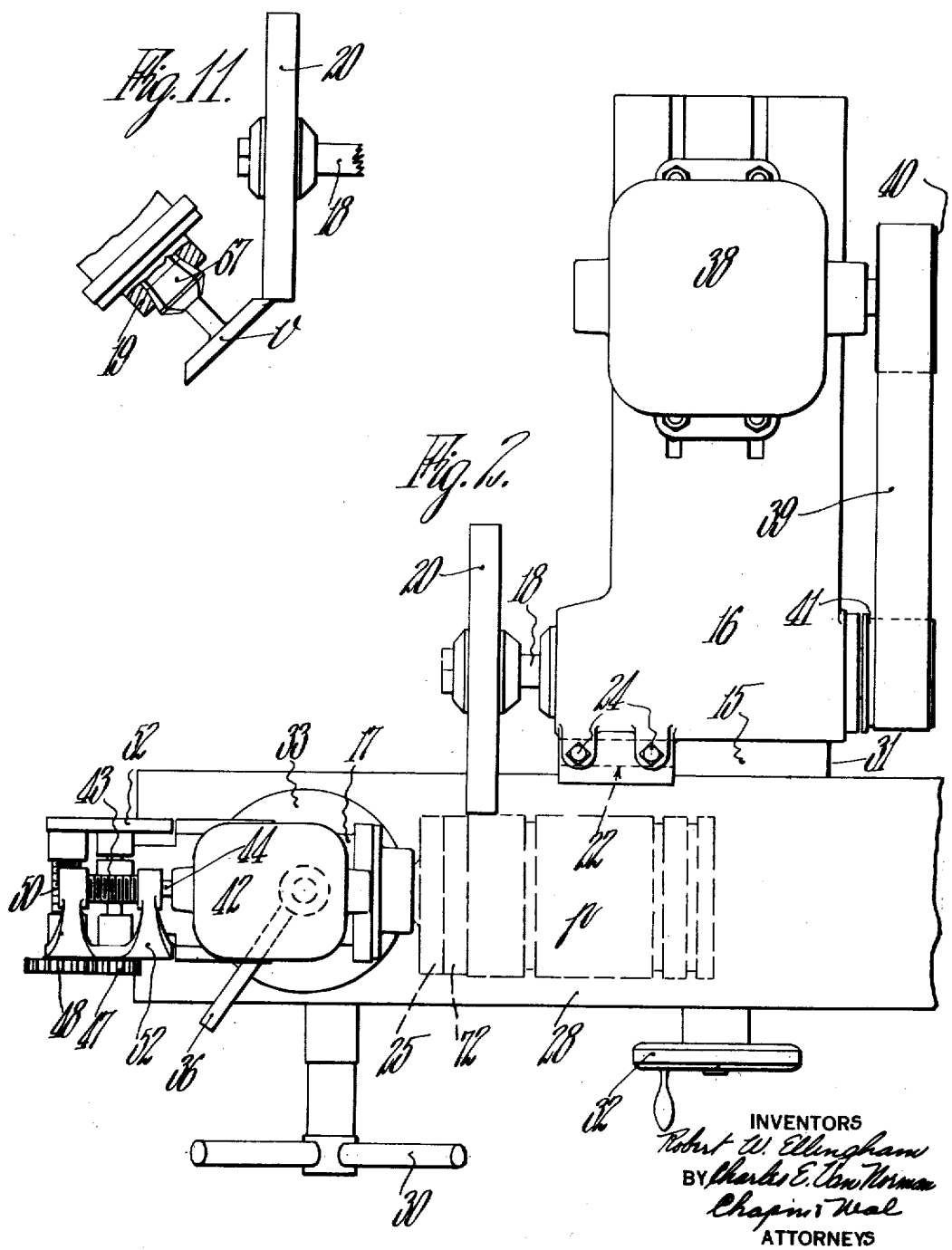

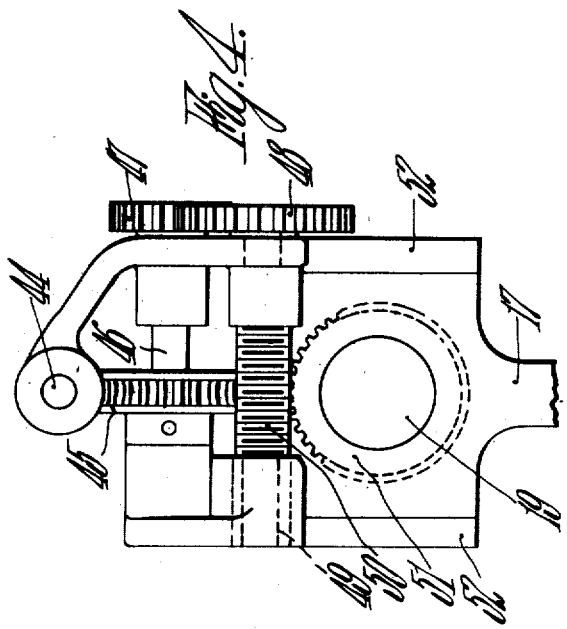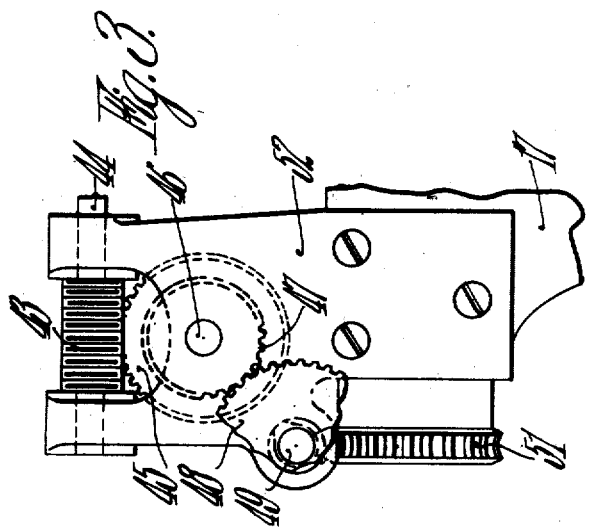

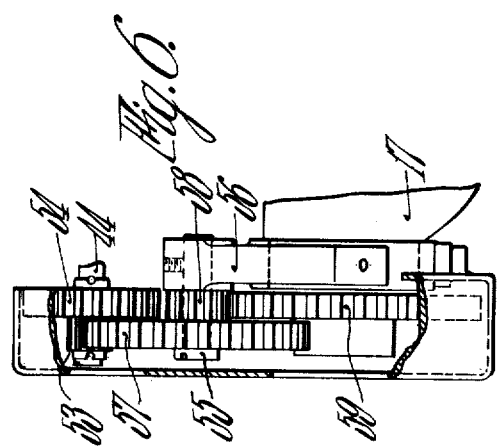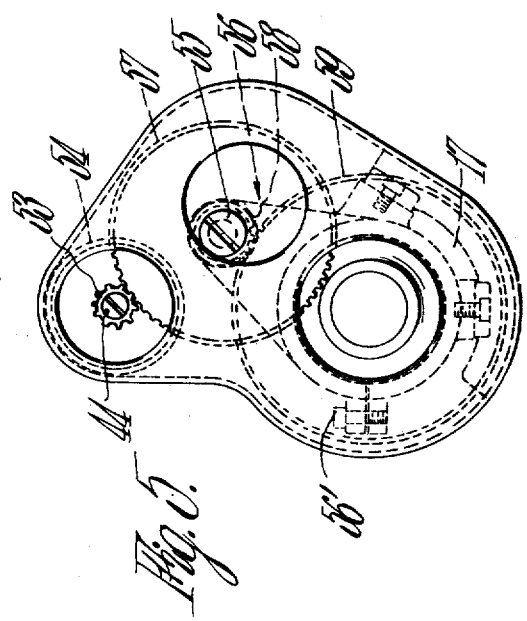

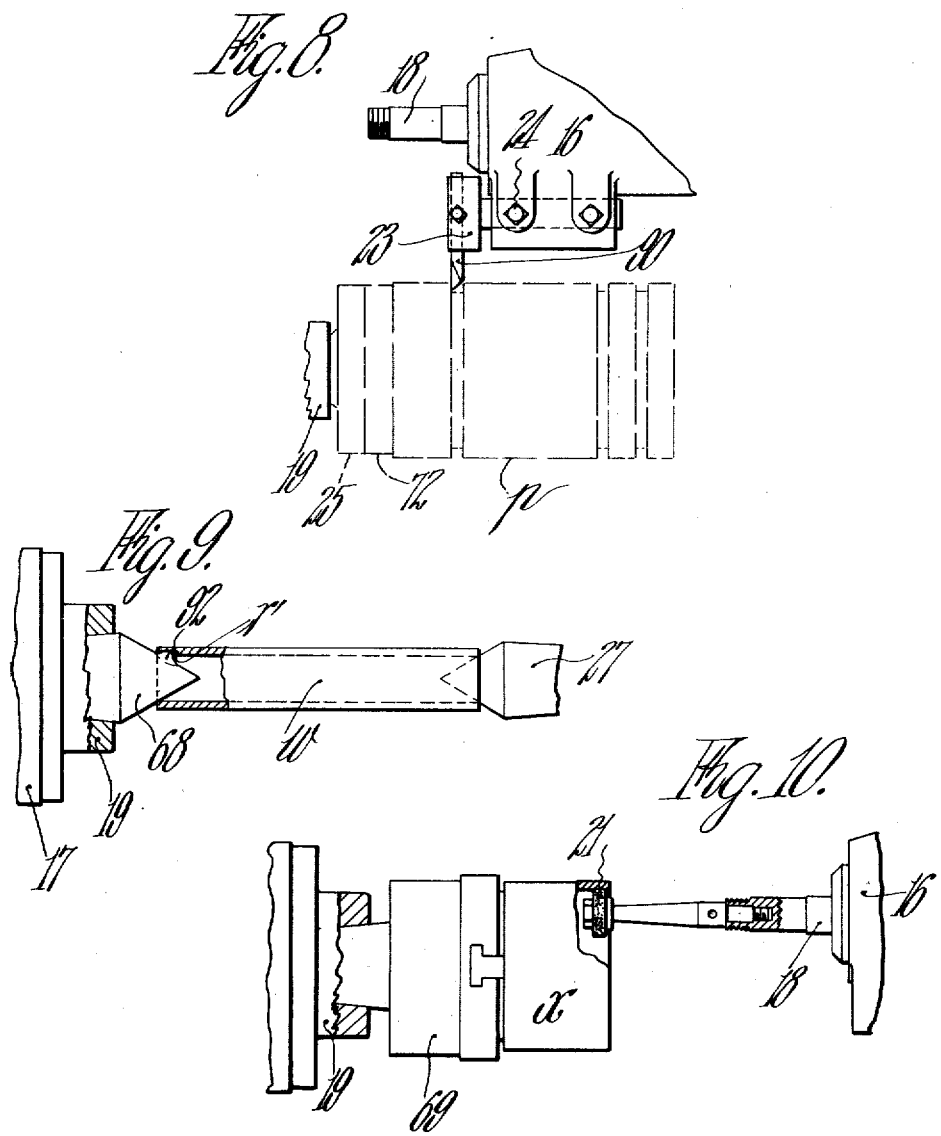

Patented Feb. 20, 1923.

1,445,875

UNITED STATES PATENT OFFICE.

ROBERT W. ELLINGHAM AND CHARLES E. VAN NORMAN, OF SPRINGFIELD, MASSACHUSETTS, ASSIGNORS TO VAN NORMAN MACHINE TOOL COMPANY, A CORPORATION OF MASSACHUSETTS.

GRINDING MACHINE.

Application filed August 29, 1921. Serial No. 496,595.

*To all whom it may concern:*

Be it known that we, ROBERT W. ELLINGHAM and CHARLES E. VAN NORMAN, citizens of the United States, residing at Springfield, in the county of Hampden and State of Massachusetts, have invented new and useful Improvements in Grinding Machines, of which the following is a specification.

This invention relates generally to improvements in machine tools and more particularly to machines which embody the characteristics of both a grinder and a lathe.

The invention is especially directed to the provision of a machine tool of the character described which can be used to perform a wide variety of operations on widely varying classes of work. While the machine of this invention is capable of general application, it is particularly intended to satisfy the needs of a special class of trade, whose business does not justify the purchase of several standard machines, such as a lathe, surface grinder, internal grinder and so forth. One example of such a class of trade is the garage, automobile repair shop and service station. In such instances, it is necessary to surface grind pistons, wrist pins and the like, to surface grind valves on a taper, to perform internal grinding as in valve cages, and to perform various lathe operations, as for example the re-grooving of pistons. To do this wide variety of work several machines would be necessary, if selection were made from the standard stock machines and the expense would seldom be justified by the volume of business done by this class of trade. Accordingly, this invention seeks to provide a single machine tool which may be used for the usual lathe operations, such as turning and facing, and also used for all sorts of grinding operations,—both internal and external, straight and taper, and many other special operations.

The invention is also concerned with the provision of a machine of the character described which is electrically and direct-driven so that it may be set up and operated in any place which is supplied with electricity, without the necessity of installing belts, shafts, countershafts and the like or the annoyance of having these power consuming elements.

Another feature of the invention consists in the separation of the drive of the wheel and work holder,—separate and independent driving means, preferably electric motors, being provided for each, whereby either the wheel head or work head or both may be moved as desired without the necessity of the compensating devices usually employed to permit such movement without interruption of the driving connections.

According to a further feature of the invention means, such as change gear mechanism, is included in the driving connections between the work holder and the driving motor therefor, whereby the work holder may be rotated at various speeds as necessitated by various kinds of work being performed.

According to another feature of the invention, gear reduction mechanism is provided in the driving connections between the work holder and the driving motor therefor so that standard motors, which rotate at very much higher speeds than those required for the work holder, may be utilized. This reduction mechanism preferably comprises a worm and worm gear, the latter preferably being driven directly by the motor and the arrangement being such that a large reduction in speed is quickly made so as to eliminate as far as possible the number of parts travelling at high speed and thereby reduce vibration of the work holder.

Another feature of the invention consists in the provision of means for connecting and disconnecting the work-holder driving motor, such means being controlled by the relative motion of the work head and wheel head so that the motor is disconnected after said heads have been separated a certain, although variable, distance and is again connected as the heads are brought toward one another. According to this feature considerable time is saved in bringing the work holder to rest as rapidly as possible for the testing, measurement, mounting or dismounting of work.

The invention is also concerned with the provision of a generally improved grinder, of compact yet rigid construction and having self contained driving means.

Other features and advantages will appear in the following description and in the illustrative embodiment of the invention in the accompanying drawings, in which—

Fig. 1 is a front elevational view of a machine embodying the invention;

Fig. 2 is a top plan view thereof;

Figs. 3 and 4 are enlarged, fragmentary, front and side elevational views respectively of the work holder driving mechanism;

Figs. 5 and 6 are similar views showing a modification in such driving mechanism;

Fig. 7 is a sectional elevation view of the work head and work holder, showing one way of mounting articles, such as pistons, thereon for surface grinding or turning operations;

Fig. 8 is a fragmentary plan view illustrating the machine as adapted for a turning operation, as for example the regrooving of a piston;

Fig. 9 is a similar view illustrative of the machine as adapted for grinding work, such as a wrist pin, on centers;

Fig. 10 is a similar view showing the machine as adapted for internal grinding;

Fig. 11 is a similar view illustrative of the machine as adapted for the performance of taper grinding on work, such as a valve; and Fig. 12 is a diagrammatical view of the electrical connections to one of the motors.

Referring to these drawings; the machine includes a suitable base 15, which as shown is adapted to be mounted on a bench although it may be otherwise supported if desired. The particular construction of base 15 is not important except that it should preferably directly underlie the two heads which it supports and be of sufficiently sturdy construction and rigidity to support the heads without undue vibration of the latter when the machine is in operation. With the particular arrangement chosen for these heads, the bed is of substantially right angular shape in plan.

Supported from bed 15 are two heads 16 and 17, one of which, as 16, will be hereinafter referred to as the wheel head and the other of which, as 17, will be hereinafter referred to as the work head. In each of these heads is mounted a rotatable spindle,—the spindles for the heads 16 and 17 being designated at 18 and 19 respectively. One of these spindles, as 18, carries a suitable grinding wheel, such as 20, the size and shape of which will, of course, be varied according to the nature of the work to be performed. Provision is made for the mounting of a smaller grinding wheel such as 21, on spindle 18, as shown in Fig. 10, and either or both may be readily removed when desired in a manner clearly obvious from Figs. 1 and 10. Provision is also made on the wheel head 16 for the reception of lathe tools,—a socket 22 being provided at the forward end of the wheel head to receive a tool holder, such as shown at 23 in Fig. 8, which may be clamped in place by set screws 24. The other spindle 19 is designed to carry some suitable device for supporting and driving the work, hereinafter referred to as a work holder. The work holder may, for example consist of a face plate 25 or any other of the usual devices employed for the purpose named, some of which will hereinafter be described. For certain classes of work, a tail stock 26, carrying an ordinary dead center 27, is provided to cooperate with the work head 17, which then serves as a head stock, to support the work on centers.

The particular manner of mounting the heads 16 and 17 on base 15 is, according to many features of the invention, unimportant and may be varied in many ways and still embody the invention. The essential thing, with respect to the mounting of these heads, is provision for relative longitudinal movement and transverse crossfeeding movement between the wheel head and work holder. Both these movements might be effected by movement of either one of these heads or one movement might be accomplished by each. As an illustrative example of one of many mountings available, the work head 17 is carried on a bed or carriage 28 which is mounted to slide longitudinally on ways 29 on base 15 and may be moved by any suitable means, as by means of a rotatable hand wheel 30 and suitable intermediate connections well understood in the art. The wheel head 16 is mounted to slide on ways 31 in a direction transverse to the line of travel of carriage 28 and may likewise be moved by any suitable mechanism, of which there has been exemplified a rotatable hand wheel 32 which through means well known in the art may move head 16 for cross feeding purposes. Since the invention is independent of the particular means for moving the heads 16 and 17, they may be operated in any suitable way appropriate for the purpose.

Aside from the provision for the two relative movements above described, it is desirable according to some features of the invention, to provide, either in conjunction with or independent of them, an arrangement which will permit oscillation of one of the heads, as for example the work head 17. Thus, the latter, as shown, is movable, relatively to its supporting carriage 28, about a vertical stud 33, and may be adjusted to bring the axis of the work holder at various angles to that of the wheel carrying spindle 18. To facilitate such adjustment, a graduated scale 34 is provided at the base of head 17 for cooperation with a mark 35 on carriage 28. The head 17 may be clamped in its various positions of angular adjustment by a handle nut 36 threaded upon the upper end of stud 33. The angular adjustability of head 17 permits all sorts of taper turning and grinding and the head may equally well be mounted for mechanical oscillation for the purpose of grinding curved surfaces, a full disclosure of mechanism for accomplishing this result and the slight changes in the mounting of the head being given in Reissued Letters Patent of the United States No. 13,892, granted March 16, 1915 to Charles E. Van Norman. Reference to this patent is also made for a disclosure of a means for automatically effecting the longitudinal and transverse movements above described.

The tail stock 26, heretofore described, is mounted on the carriage 28 for longitudinal adjustment and may be clamped in various positions of adjustment by means of a handle nut 37, all in a manner, which is analogous to the mounting of a tail stock in a lathe and is too well known in the art to require further description.

In accordance with this invention separate and entirely independent driving means are provided for the work holder and wheel carrying spindle and such means, in each case, preferably consists of an electric motor. By so doing the source of power may be located in close proximity to the driven elements and the usual multiplicity of driving connections avoided, together with the annoyance of their presence and the power loss incident to them. Also the machine may be made compact for use on the bench and in limited quarters where little floor space is available. Furthermore the machine is readily and quickly installed by almost anyone, for it requires merely an electrical connection to the nearest lamp socket or other source of supply, as contrasted with the usual installation of shafts, countershafts, pulleys and belts, all of which requires a skilled workman.

For driving the wheel carrying spindle 18, an electric motor 38 is provided, such motor being mounted to move with the head, as for example by being fixed directly thereon, as indicated in Fig. 2, so that the usual compensating devices, ordinarily employed to permit relative movement between the driving and driven elements without interruption in the continuity of drive, become unnecessary. The elimination of these devices eliminates a number of parts which ordinarily travel at very high speed and the elimination of each such part not only simplifies the machine but does much to reduce vibration, freedom from which is essential for precise grinding. The motor is connected to the wheel carrying spindle by a belt 39 and suitable pulleys 40 and 41 and is preferably adjustable on head 16 in the ordinary way for tensioning the belt. Other pulleys may be supplied which are interchangeable with the pulleys 40 and 41 to change the speed ratio between the motor and spindle so that grinding wheels of various diameters may be driven at the proper speeds.

The work holder is likewise driven by an electric motor, indicated at 42, such motor being mounted to move with the work head 17, as for example by being directly fixed thereto, as indicated in Figs. 1 and 2. The work holder, however, is designed to travel much slower than the wheel carrying spindle and therefore it is necessary, with the ordinary motor, to provide speed reducing mechanism between it and the work holder spindle. Such mechanism may take various forms, as desired, but desirably includes a worm, as 43, fixed directly to the shaft 44 of motor 42, and a worm wheel 45 fixed to a shaft 46. By this arrangement a considerable reduction in speed is accomplished with a minimum amount of gearing and it is insured that there will be as few as possible of parts moving at relatively high speed. Thus, in the present case only the motor shaft 44 moves at very high speed. The reduction to a minimum number of parts, which travel at high speed, is of great importance in its effect on the reduction of vibration of the work holder and a reduction in such vibration means increased accuracy in the work performed.

The shaft 46 described is connected to the work holder spindle by any suitable means, as by gear train such as the intermeshing spur gears 47 and 48, the former being carried by shaft 46 and the latter by a shaft 49. These two gears 47 and 48 are mounted for convenient removal to permit other gears of different ratios to be substituted therefor. Thus, they constitute change gear mechanism to permit the spindle 19 to be driven at various speeds according to the requirements of the work being done.

The shaft 49 is connected to spindle 19 in any way desired, and if further speed reduction is desired, this may be accomplished, as indicated in Figs. 1 and 2, by a worm 50 on shaft 49 driving a worm gear 51 fixed on spindle 19. The shafts 44, 46 and 49 are mounted in suitable brackets 52 fixed to head 17.

Another form of speed reduction and change speed mechanism is shown in Figs. 5 and 6, and comprises spur gear trains. Two pinions 53 and 54, fixed together, are mounted on shaft 44 for convenient removal so that their illustrated positions may be reversed, thus affording two drivers of different size to effect changes in speed.

Mounted on a stud 55 fixed to an arm 56, which is adjustably secured to the work head, as by bolts 56', is a gear 57 and fixed to the latter is a pinion 58 which meshes with a gear 59 fixed to the spindle 19. The arm 56 may be turned about the axis of spindle 19 in order to permit gear 54 (when reversed from the position illustrated) to mesh with it.

The work holder spindle 19 may be variously constructed as desired. An example of one desirable construction is shown in Fig. 7. The work holder spindle 19 is preferably tapered, as indicated at 60, and is held against longitudinal movement between a flange 61 and an adjustable take up nut 62, both mounted on the spindle, and cooperating respectively with the outer end face of head 17 and a shoulder provided in the interior thereof. The spindle 19 is provided with an axial passage from end to end. One end of this passage affords a tapered seat for the reception of a collet 63, the inner end of which is screw threaded as shown. Extending into this passage from the opposite end is a drawing spindle 64, having at its inner end an interiorily threaded portion to engage the threaded portion of collet 63 and draw it in place on its seat. The outer end of spindle 64 is provided with a hand wheel 65 to facilitate the operation described. The spindle 64 is likewise provided with an axial passage therethrough.

The spindle 19 may carry work holders of various types, such as a face plate 25 fixed to the collet 63, and is provided with a tapered bore to receive a live center 68 (Fig. 9) or the spindle of a chuck 69 (Fig. 10). The face plate 25 in this instance is provided in its outer face with a recess 70 which is designed to receive a correspondingly shaped projection 71 on any of a number of blocks 72, which may be of various sizes and shapes. For example for mounting a piston, such as shown at $p$ in Fig. 7, a block 72 having a projection 73 of a size to enter and closely fit the open end of the piston is mounted on face plate 25, and centered thereby. To hold the piston and block 72 to face plate 25, a rod $r$ is passed through the face plate, collet and drawing spindle, prior to the mounting of the piston and a pin $q$ is passed through the wrist pin openings $o$ in the piston $p$ and through an eye $e$ in rod $r$. This rod $r$ is long enough to extend through the entire work head and beyond hand wheel 65 and may be drawn up by a nut 74, threaded upon rod $r$ and acting against the hand wheel 65, whereby the piston may be clamped in place. Other blocks 72 may be provided to fit pistons of other sizes or other work of different character.

Preferably, means are provided for automatically stopping the rotation of the work holder spindle 19 whenever measurement, testing, or dismounting and replacing of the work is desired. This result may, in this instance, be conveniently obtained by merely interrupting the electrical supply circuit for the motor 42. Thus, as shown in Fig. 12, a switch $s$ is interposed in one of the two supply wires 80 leading to this motor. Referring to Fig. 1, this switch $s$ includes the two contacts 81 and 82, one of which is stationarily mounted on base 15 and the other on one arm of a movable bell crank lever 83, pivoted at 84 to the base and normally held by a spring 85 in such position as to hold the contacts in engagement. Both of these contacts are suitably insulated as shown. For controlling the opening of switch $s$, a block 86 is mounted on carriage 28, preferably for longitudinal adjustment, as by a bolt 87 and a T-slot 88. The other arm of bell crank lever 83 is disposed in the path of block 86, whereby after the carriage has travelled a predetermined distance, the block moves lever 83, separates contacts 81 and 82 and opens the circuit to motor 42, whereupon the work holder spindle 19 rapidly comes to rest. This result is accomplished under the control of the relative movement between the heads,— the switch being opened after the latter have been separated by or beyond a predetermined degree, which is variable by adjustment of block 86, and the switch being again closed after the heads have approached each other by or beyond a predetermined distance which is also variable. Various other means of accomplishing this result may be employed, as desired, the one particular means disclosed being given merely by way of illustrative example.

The general operation of the machine is analogous to ordinary grinders and is too well understood to require description here. It remains to be pointed out, however, that a wide range of work, and work of widely varying character, may be performed in this machine.

The machine has a relatively large swing, and surface grinding or turning of work of large as well as small diameter, can be equally well performed. The surface grinding of work of relatively large diameter is illustrated in Fig. 7 in connection with the piston of an automobile engine. Work of much larger diameter may equally well be handled. Turning operations on work of large diameter are exemplified in Fig. 8, wherein a lathe tool 90, mounted in a tool holder 23, held in socket 22, is shown as arranged for regrooving a piston *p*. Other usual turning operations may likewise be performed in an analogous manner. Work of small diameter may be turned or ground on centers, utilizing the tail stock 26 in conjunction with the work head 17 with dead and live centers, respectively carried by them. This is illustrated by the operation of grinding a wrist pin *w* (see Fig. 9). In this instance the live center is provided with a projection 92 which enters a recess *r'* in the wrist pin and serves as a dog to drive the work. Internal grinding may also be performed as indicated in Fig. 10. In this instance the work *x* is held in a chuck, mounted in the spindle 19 in a manner analogous to collet 63, and the wheel 20 is removed and a small wheel substituted. It is readily possible, as above disclosed, to oscillate the work head 17 and locate it properly with respect to the axis of oscillation 33, so that curved surfaces, such as ball races may be ground, if desired. In addition, by adjusting the work head 17 about its axis 33 and clamping it in place, the work may be rotated with its axis at an angle to that of the wheel so that all sorts of taper grinding or turning may be performed. This is illustrated in Fig. 11 in connection with the operation of grinding the frusto-conical surface of a valve *v*, the valve being supported by inserting its stem *t* into the spring collet 67, mounted similarly to the collet 63, and then clamping it therein by turning the handle 65, thus utilizing the collet as a chuck.

While the invention has been disclosed more particularly in connection with certain specific uses which make it especially adaptable for automobile repair work, it is capable of many other and wider adaptations to other specifically different purposes. It is especially suitable for use wherever a work of widely varying character has to be performed and the volume of business available does not justify the purchase of a number of standard stock machines. The one machine disclosed, by its practically "universal" character, fills the place of the several machines which would otherwise be necessary. Moreover, the machine is compact, sturdy, affords the desired conditions of rigidity to insure accurate grinding, and withal may be set up anywhere by almost anyone, for no special skill is required for its simple installation. Furthermore, the machine possesses important advantages, fully described heretofore, which follow from the use of the motor drive and the individual motor drive for each spindle; also from the mounting of each motor for movement with its respective head.

The invention has been disclosed herein, in an embodiment at present preferred, for illustrative purposes but the scope of the invention is defined by the appended claims rather than by the foregoing description.

What we claim is:

1. In a combined grinding machine and lathe, a base, a wheel head and a rotary work carrying head mounted on the base and movable the one relatively to the other in longitudinal and transverse directions, a spindle mounted on the wheel head, means for rotating said spindle, and means on said head for holding a lathe tool.

2. In a combined grinding machine and lathe, a base, two heads supported thereon, one of said heads being slidably movable relatively to the other head on ways provided on said base, a rotary work holder mounted on one head, a rotary wheel carrying spindle mounted on the other head, and supported for movement relatively to the base in a direction angularly to the direction of said ways a lathe tool.

3. In a grinding machine, a base, a work head and a wheel head mounted for movement thereon one relatively to the other in longitudinal and transverse directions, a hollow spindle mounted on the work head, one end of said spindle being adapted to receive a work supporting member, a gear mounted on the other end of said spindle, a motor mounted on the work head, gear connections between said motor and spindle, and means at the last-named end of said spindle to exert a binding pressure against the said work supporting member.

4. In a grinding machine, a base, two devices slidably supported thereon and each carrying a rotary spindle, one device being adapted for movement in a direction parallel to the axis of the spindle in the other device, one of said devices being adjustably movable about a vertical axis, one of the said spindles being adapted to receive a work supporting member at one end, means at the other end of the last-named spindle for exerting a binding pressure against the said supporting member, a grinding wheel mounted on the other spindle, a motor mounted above the work-carrying spindle and in driving connection therewith, separate motor means for driving the other spindle, quick acting means for reciprocating one of said devices, and slow acting means for moving the other device in a direction substantially at right angles to the direction of movement of the first-named device.

5. In a grinding machine, a base, rotary work holding and wheel carrying devices slidably supported on the base, a spindle mounted in the wheel carrying device, the work-holding device being movable in a direction parallel to the axis of said spindle, the wheel carrying device being movable in a direction right angularly to the movement of the work holding device, a spindle mounted on the work holding device and having its inner end arranged to receive a work holding member, means at the outer end of said spindle to impart a binding pressure against said work holder, a motor mounted on said work holding device, driving connections between said motor and the outer end of said work carrying spindle, separate motor means to drive the wheel spindle, and means for fixing the spindle on the work holding device in a direction angularly to the axis of the wheel spindle.

6. In a grinding machine, a base, a wheel carrying spindle mounted for slidable movement on the base in a direction right angularly to the axis of said spindle, separate motor means for rotating said spindle, a work head mounted for slidable movement on the base in a direction parallel to the axis of said spindle, a motor secured on top of the work head, a gear mounted on the motor's shaft, a spindle mounted on the work head and having one end adapted to receive a work holding member, means to exert binding pressure against said holding member, and a gear mounted on said last named spindle near its other end for driving connection with the first named gear.

7. In a grinding machine, a base, a wheel carrying spindle mounted for slidable movement on the base in a direction right angularly to the axis of said spindle, separate motor means for rotating said spindle, a work head mounted for slidable movement on the base in a direction parallel to the axis of said spindle, a motor secured to the top portion of said head, a gear mounted on the motor's shaft, a spindle mounted in the work head and having one end adapted to receive a work holding member, a gear mounted on said last-named spindle remote from said holding member and driven from the first-named gear, adjustable take-up means between said spindle gear and said holding member to compensate for wear of said spindle, and means for fixing the work head spindle in a direction angularly to the direction of travel of either of said slides.

8. In a combined grinding machine and lathe, a base, a work head, a tailstock, and a wheel head all supported on said base, the tailstock being movable relatively to the work head, a spindle mounted in the wheel head, the latter head being movable relatively to the axis of said spindle, means for rotating said spindle, and means on the wheel head for holding a lathe tool.

9. In a combined grinding machine and lathe, a base, a work head, a tailstock and a wheel head all supported on said base, a wheel carrying spindle mounted in the wheel head, means for rotating said spindle, the tailstock and the wheel head being adapted for movement each in a different direction relatively to the axis of said spindle, and means on said wheel head for holding a lathe tool.

10. In a grinding machine, a base, rotary work holding and tool carrying heads slidably supported on the base, a spindle mounted in the tool head, the work head being movable in a direction parallel to the axis of said spindle, the tool head being movable in a direction right angularly to its spindle's axis, a spindle journaled in the work head and having one end adapted to receive a work holding member, the work head having its top portion formed to receive a motor, means for securing said motor to said portion, driving connections between said motor and spindle and remote from said work holding member, and separate means for driving the tool spindle.

11. In a combined grinding machine and lathe, the combination of a base, a wheel head mounted for horizontal sliding movement thereon, a wheel carrying spindle in said head, a motor, driving connections between the motor and the wheel carrying spindle, a work head supported by the base and mounted for horizontal sliding movement in directions at right angles to the directions of movement of the wheel head, a rotatable work holder journaled in the work head, a second motor mounted to move with the work head, driving connections between the second motor and the work holder, means for moving the wheel head, means for moving the work head, and means on the wheel head for holding a lathe tool to adapt the machine for use as a lathe.

12. In a combined grinding machine and lathe, the combination of a base, a wheel head mounted for horizontal sliding movement thereon, a wheel carrying spindle in said head, a motor, driving connections between the motor and the wheel carrying spindle, a work head supported by the base, a rotatable work holder journaled in the work head, a second motor mounted to move with the work head, driving connections between the second motor and the work holder, means for moving the wheel head, means for moving the work head, and means on the wheel head for holding a lathe tool to adapt the machine for use as a lathe.

13. In a grinding machine, a base, a work head and a wheel head mounted on the base, one of said heads being adapted for slidable movement relatively to the other head, a rotary spindle supported in each head, the work head spindle having one end adapted to receive a work holding member, driving means connected to the other end of said spindle, adjustable take-up means between the said driving means and holding member, driving means for the wheel spindle, and means for fixing one of said spindles in a direction angularly to the axis of the other spindle.

14. In a grinding machine, a base, a work head and a wheel head mounted thereon, one head mounted for movement toward and away from the other, a wheel carrying spindle mounted in the wheel head, motor means for driving the spindle, a rotatable work holder mounted in the work head, motor means for driving the work holder, and means operable at a predetermined point on separation of said heads to render the last named driving means ineffective to drive the work head.

15. In a grinding machine, a base, a work head and a wheel head mounted thereon, one head mounted for movement toward and away from the other, a wheel carrying spindle mounted in the wheel head, motor means for driving the spindle, a rotatable work holder mounted in the work head, motor means for driving the work holder, means operable at a predetermined point on separation of said heads to render the last named driving means ineffective to drive the work head, and operable at a predetermined point on movement of said heads toward one another to again render said driving means effective.

16. In a grinding machine, a base, a work head and a wheel head mounted thereon, one head mounted for movement toward and away from the other, a wheel carrying spindle mounted in the wheel head, motor means for driving the spindle, a rotatable work holder mounted in the work head, a motor to drive the work holder, a switch controlling the last named motor and means operable at a predetermined point on separation of said heads to open the switch.

17. In a grinding machine, a base, a work head and a wheel head mounted thereon, one of said heads mounted for movement toward and away from the other, a wheel carrying spindle mounted in the wheel head, means for driving the spindle, a rotatable work holder mounted in the work head, a motor mounted to move with the work head, driving connections between said motor and the work holder, a switch controlling said motor and means operable at a predetermined point on separation of said heads to open the switch, and operable at a predetermined point on movement of said heads toward one another to close said switch.

18. In a grinding machine, a base, a work head and a wheel head mounted thereon, one of said heads mounted for movement toward and away from the other, a wheel carrying spindle mounted in the wheel head, means for driving the spindle, a rotatable work holder mounted in the work head, a motor mounted to move with the work head, driving connections between said motor and the work holder including change speed gearing, a switch controlling said motor and means operable at a predetermined point on separation of said heads to open the switch, and operable at a predetermined point on movement of said heads toward one another to close said switch.

19. In a grinding machine, a base, a work head and a wheel head mounted thereon, a rotary spindle mounted in each of said heads, the work spindle having one end adapted to receive a work holding member, driving means connected to another portion of said spindle, adjustable take-up means between said driving means and holding member, one of said heads being slidably movable in a direction parallel to the axis of the other head's spindle and adjustably movable about a vertical axis, driving means for the wheel spindle, and means for reciprocating the slidable head.

20. In a combined grinding machine and lathe, the combination of a base, a wheel head and a work head mounted thereon and movable the one relatively to the other in longitudinal and transverse directions, a wheel carrying spindle in the wheel head, a motor, driving connections between the motor and said spindle, a rotatable work holder mounted in the work head, means for driving the work holder, and means on the wheel head for holding a lathe tool to adapt the machine for use as a lathe.

21. In a combined grinding machine and lathe, a base, a work head, a wheel head, a lathe tool holder, and a lathe tool in said tool holder, the work head being mounted for slidable movement on ways provided in the base and adjustably movable about a vertical axis, a motor mounted for movement with the work head, a rotary spindle supported in each of said heads, driving connections including speed reduction gearing between said motor and the work spindle, the said lathe tool being supported for movement relatively to the base in a direction right angularly to the direction of said ways, and means for driving the wheel spindle.

22. In a combined grinding machine and lathe, a base, a work head, a wheel head, a lathe tool holder, and a lathe tool in said holder, the work head being horizontally movable on ways provided in the base, a rotary spindle supported in each of said heads, a wheel carried by the wheel spindle, a separate motor mounted in driving connection with each of said spindles, the driving connections for the work spindle including a worm and a worm gear, the said lathe tool being slidably supported for movement relatively to the base in a direction right angularly to the direction of said ways.

23. In a combined grinding machine and lathe, a base, a work head, a wheel head, a lathe tool holder, and a lathe tool in said tool holder, the work head being mounted for slidable movement on ways provided in the base, a motor mounted for movement with the work head, a rotary spindle supported in each of said heads, driving connections between said motor and the work spindle, the said lathe tool being supported for movement relatively to the base in a direction right angularly to the direction of said ways, and means for driving the wheel spindle.

In testimony whereof we have affixed our signatures.

ROBERT W. ELLINGHAM.
CHARLES E. VAN NORMAN.

Certificate of Correction.

It is hereby certified that in Letters Patent No. 1,445,875, granted February 20, 1923, upon the application of Robert W. Ellingham and Charles E. Van Norman, of Springfield, Massachusetts, for an improvement in "Grinding Machines," errors appear in the printed specification requiring correction as follows: Page 5, line 85, claim 2, before the word "supported" insert the words *a lathe tool*, and line 87, strike out the words "a lathe tool"; and that the said Letters Patent should be read with these corrections therein that the same may conform to the record of the case in the Patent Office.

Signed and sealed this 3d day of April, A. D., 1923.

[SEAL.]
KARL FENNING,
*Acting Commissioner of Patents.*